United States Patent
Shaffer et al.

(10) Patent No.: US 8,081,749 B1
(45) Date of Patent: Dec. 20, 2011

(54) SYSTEM AND METHOD FOR INTEGRATED QUEUE MANAGEMENT

(75) Inventors: Shmuel Shaffer, Palo Alto, CA (US); Labhesh Patel, Mountain View, CA (US); Joseph F. Khouri, San Jose, CA (US); Gebran G. Chahrouri, Menlo Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 1795 days.

(21) Appl. No.: 10/847,603

(22) Filed: May 17, 2004

(51) Int. Cl.
*H04M 3/00* (2006.01)

(52) U.S. Cl. .............. 379/266.01; 379/215.01

(58) Field of Classification Search ............ 379/266.01, 379/266.06, 215.01, 265.02
See application file for complete search history.

(56) References Cited

U.S. PATENT DOCUMENTS

| | | | |
|---|---|---|---|
| 4,788,715 A | 11/1988 | Lee | 379/84 |
| 5,311,574 A | 5/1994 | Livanos | 379/88 |
| 5,329,583 A | 7/1994 | Jurgensen | 379/266 |
| 5,506,898 A | 4/1996 | Costantini et al. | 379/266 |
| 5,511,112 A * | 4/1996 | Szlam | 379/266.06 |
| 5,857,018 A | 1/1999 | Sumner | 379/266 |
| 5,905,793 A | 5/1999 | Flockhart et al. | 379/266 |
| 5,946,388 A | 8/1999 | Walker et al. | 379/266 |
| 6,002,760 A | 12/1999 | Gisby | 379/266 |
| 6,046,762 A | 4/2000 | Sonesh | 348/16 |
| 6,049,603 A | 4/2000 | Schwartz et al. | 379/309 |
| 6,088,444 A | 7/2000 | Walker et al. | 379/266 |
| 6,263,066 B1 | 7/2001 | Shitvelman et al. | 379/266 |
| 6,314,178 B1 | 11/2001 | Walker et al. | 379/266.01 |
| 6,546,087 B2 | 4/2003 | Shaffer | 379/90.01 |
| 6,563,916 B1 * | 5/2003 | Deutsch et al. | 379/215.01 |
| 6,654,447 B1 * | 11/2003 | Dewan | 379/76 |
| 6,665,396 B1 | 12/2003 | Khouri et al. | 379/266.01 |
| 6,724,764 B2 * | 4/2004 | Bondarenko et al. | 370/401 |
| 6,738,473 B1 * | 5/2004 | Burg et al. | 379/266.01 |
| 7,050,568 B2 * | 5/2006 | Brown et al. | 379/266.01 |
| 7,130,411 B2 * | 10/2006 | Brown et al. | 379/266.01 |
| 7,231,035 B2 * | 6/2007 | Walker et al. | 379/266.01 |
| 2003/0231757 A1 * | 12/2003 | Harkreader et al. | 379/265.02 |
| 2005/0198107 A1 * | 9/2005 | Cuhls et al. | 709/201 |
| 2006/0018456 A1 * | 1/2006 | Kunkel | 379/265.02 |

* cited by examiner

*Primary Examiner* — Olisa Anwah
(74) *Attorney, Agent, or Firm* — Baker Botts L.L.P.

(57) ABSTRACT

A system and method for integrated queue management are provided. The method may include receiving, from a user, a request for a connection to one of a plurality of agents. The request for a connection may be queued if the plurality of agents are unavailable. A request to delay the connection with the one of the plurality of agents may be received, from the user. In accordance with a particular embodiment of the present invention, the connection with the one of the plurality of agents is delayed. A request to continue in the queue may be received from the user. Finally, the user may be connected with one of the plurality of agents.

39 Claims, 1 Drawing Sheet

SYSTEM AND METHOD FOR INTEGRATED QUEUE MANAGEMENT

TECHNICAL FIELD OF THE INVENTION

The present invention relates generally to call centers, and more particularly, to a system and method for integrated queue management.

BACKGROUND OF THE INVENTION

Automatic call distributors (ACDs) are used to collect and distribute telephone calls to awaiting agents, as they become available. Accordingly, incoming calls may be evenly distributed between agents on a first in-first out (FIFO) basis. ACDs often include music, announcements, radio stations and/or advertisements which callers may listen to while waiting for an available agent. In addition, ACDs may be used by companies to manage outgoing calls.

An interactive voice response (IVR) may also be incorporated into the communications network and/or ACD. The purpose of the IVR is to exchange information with a user automatically, without human interaction. Therefore, information may be collected from users while awaiting an available agent. Users choosing to remain on hold awaiting an available agent and/or resource must be available when the user is connected with the agent, or risk losing their place in the queue.

SUMMARY OF THE INVENTION

The present invention provides a system and method for integrated queue management that substantially eliminate or reduce the problems and disadvantages associated with the previous methods and systems. In particular, a user may be provided with the ability to delay her connection with an agent associated with an automatic call distributor, and/or pause her position in a queuing system associated with the automatic call distributor, if the user would like to accomplish another task while in the queue.

In accordance with a particular embodiment of the present invention, a method for integrated queue management includes receiving, from a user, a request for a connection to one of plurality of agents. The request for a connection may be queued, if the plurality of agents are unavailable. A request to delay the connection with the one of the plurality of agents may be received from the user. The connection with one of the plurality of agents may be delayed in response to the request. Afterwards, a request to continue in the queue may be received from the user. Finally, the user may be connected with one of the plurality of agents.

In accordance with another embodiment of the present invention, a method for integrated queue management includes receiving, from a user, a request for a connection to one of a plurality of agents. The request for a connection may be queued if the plurality of agents are unavailable. A request to establish an Instant Messaging session with a call center, may be received from the user. The Instant Messaging session between the user and the call center may be established. Information may be provided to the user regarding the user's position in a queue, using the Instant Messaging session. Finally, the user may be connected with one of the plurality of agents.

In accordance with still another embodiment of the present invention, a method for integrated queue management includes receiving, from a user, a request for a connection to one of a plurality of agents. The user may be connected with one of the plurality of agents. An indication that the user would like to pause a communication session with the agent may be received from the user. In response, the communication session may be paused, while maintaining the user at a high priority in a queue. Afterwards, a request to continue the communication session may be received from the user. Finally, the user may be reconnected with the one of the plurality of agents.

Technical advantages of particular embodiments of the present invention include a system that defines new internal states (e.g., "paused" and "active") for callers in the queue of an automatic call distributor. Thus, the system allows callers who are placed in a call center queue to cater to other tasks, without losing their place in the queue.

Another technical advantage of particular embodiments of the present invention includes a system and method for integrated queue management that allows callers in the paused state to continue to advance in the queue, until they reach the head of the queue. Accordingly, the system is configured to allow, or to prohibit callers to be transferred to a free agent, if they reach the head of the queue while they are in the paused state. Accordingly, callers may delay their transfer to an agent until another task is completed.

Other technical advantages of the present invention will be readily available to one skilled in the art from the following figures, descriptions, and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following descriptions, taken in conjunction with the accompanying drawings, in which.

DETAILED DESCRIPTION OF THE INVENTION

Figure 1:
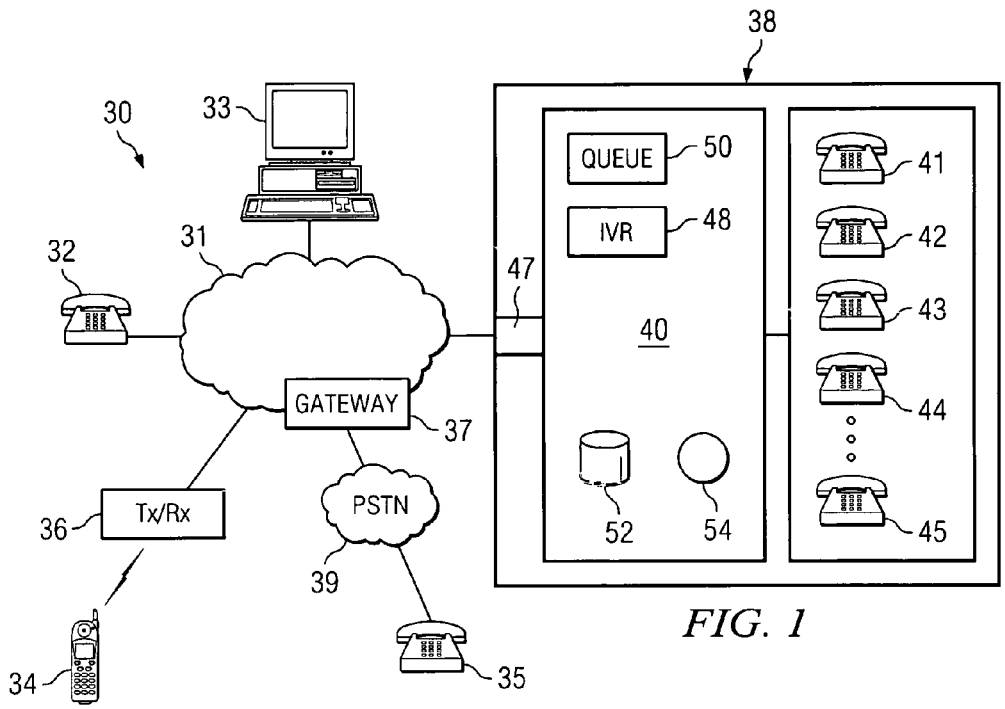
FIG. 1 is a block diagram illustrating a communication network in accordance with a particular embodiment of the present invention.
Figure 2:
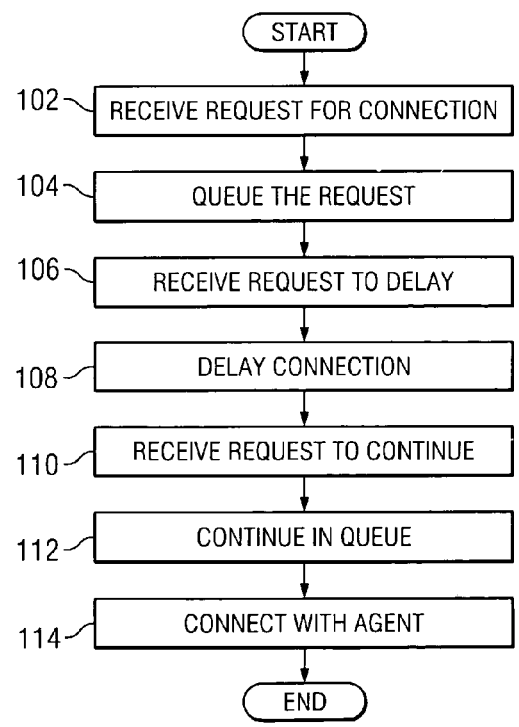
FIG. 2 is a flow diagram illustrating a method for integrated queue management that allows a user in the queue of an automatic all distributor to delay a connection with an agent, in order for the user to accomplish another task.

Various embodiments of the present invention and its advantages are best understood by referring now in more detail to FIGS. 1 and 2 of the drawings, in which like numerals refer to like parts.

Referring now to FIG. 1, a communications network is illustrated and generally designated by the reference number 30. Network 30 includes a plurality of terminal units, or endpoints 32-35. Network 30 is also coupled with a call center 38. In the illustrated embodiment, call center 38 includes an automatic call distributor (ACD) 40, that couples network 31 with a plurality of agents 41-45 associated with the call center 38. In accordance with the teachings of the present invention, ACD 40 is equipped with a pause feature that allows a user to control the timing of being connected with an agent. For example, if the user would prefer to freeze her position in the queue while tending to another task, the user can communicate her desire to ACD 40, to avoid losing her place in the queue in the event that the user is not available at the time that an agent becomes available. The term "user" is used interchangeably with "caller" herein, since the teachings of the present invention envision that contact between the user and the call center may be accomplished by mechanisms other than telephone calls (e.g., email, IM, etc).

ACD 40 receives communications from network 30 and distributes the communications between one or more of a plurality of agents 41-45. ACD 40 is a specialized phone system used to route and distribute incoming calls to available agents 41-45. ACD 40 may include any combination of hardware, software and/or encoded logic necessary to perform the functionality described herein. For example, in the illustrated embodiment, ACD 40 includes an interactive voice response (IVR) system 48, a queuing system 50, a database 52 and a processor 54.

With respect to incoming calls, ACD 40 performs many functions. For example, ACD 40 has the ability to recognize and answer incoming calls. Database 52 includes instructions on how to handle each call. Based on these instructions, ACD 40 will distribute calls according to specific criteria. Recorded messages may also be incorporated into ACD 40 instructing a caller regarding the average waiting time for soliciting information from a caller. Typically, ACD 40 distributes incoming calls to the first available of agents 41-45 that has the skill set and resources necessary to transact business and/or provide information to the user.

As discussed above, ACD 40 also incorporates interactive voice response (IVR) technology. For example, IVR 48 may be used in order to collect information from users of ACD 40 and/or communications network 30. IVR 48 may be used to collect information from a calling party using analog signals generated by a human voice or other sound, and/or digital signals where the calling party includes the ability to generate digital signals. Accordingly, IVR 48 automates the retrieval and processing of information by phone in order to automate telephone based tasks.

ACD 40 may include a system which plays music, advertisements, radio stations and/or announcements to a caller while the caller is on hold. Accordingly, the caller has the option to remain on the line and await an available agent, or the caller may simply hang up and end the communication session. In accordance with a particular embodiment of the present invention, if the caller elects to remain on the line and await the agent, a communication channel between the caller and the call center remains active.

Queuing system 50 provides ACD 40 with the ability to maintain callers in queue, until the an agent is available for connection with a particular caller. Various techniques are known and available to queue and distribute calls as the agents become available. For example, many queuing systems operate on a first in/first out ("FIFO") queuing system such that the first user to call is the first connected with an agent. However, various other techniques may also be used to more effectively manage the connection of callers to agents, based upon priority schemes, and/or mechanisms by which callers are matched with agents having a particular skill set (e.g., foreign language speaking agents). The particular type of queuing system that is used to determine the initial order in which the calls are queued is not essential to the invention, with the exception of the techniques described below.

A typical queue includes an excess of callers that are waiting to be connected with an agent. Each caller in the queue has an associated position in the queue that establishes the order in which the call will be connected with an agent. When the agent becomes available, and the caller is at or near the head of the queue, the caller may be connected with the agent.

In the past, such ACDs and queuing systems did not allow a user to delay the connection with an agent, if the user so desired. For example, a caller that is awaiting an agent may receive another telephone call on another telephone line (e.g., mobile phone) that the user is inclined to accept. Such prior systems would not take into account the fact that the caller was temporarily unavailable, and the user would be connected with the agent when the caller reached the head of the queue. If the caller was not available (e.g., was not on the line to hear the agent), the agent would simply hang-up. Accordingly, the user would forfeit her position in the queue, and be forced to call in again and obtain a position in the back of the queue.

In accordance with the teachings of the present invention, a user is given the option to "pause" while in the queue, such that the user will not be connected with an agent until the caller elects to continue in the queue. The pause feature may be accomplished using one or more algorithms that indicate to the ACD and/or queuing system that the caller's position in the queue should be handled differently than others.

A particular embodiment of the present invention is described by the following example. A caller connects with an ACD and indicates a desire to speak with an agent. Information is collected from the user using a self-service IVR. As the caller is placed in the queue, and before the user is presented with music on hold ("MOH"), the following prompt is played to the user: "To pause your place in the queue while on hold, please press '1' or say 'pause'. To continue in the queue after pausing, please press '2' or say 'continue'." Following the announcement, the user is presented with MOH.

While the user is listening to MOH, the user receives another telephone call on another telephone extension of her telephone. Before putting the call center on hold, the user speaks into the telephone "pause", and the ACD handles the request for connection with the agent as described below.

Each time an agent becomes available to handle a caller in the queue in which the user is waiting, the caller immediately behind the user is promoted to a position in the queue immediately ahead of the user. Using this algorithm, the user is not progressing in queue while she is not actively waiting for an agent. Rather, her position in the queue is frozen, or preserved, until the user indicates that the user would like to continue in the queue (e.g., says 'continue' to the ACD).

In accordance with another embodiment, a paused user's position in the queue may be handled differently. For example, the paused user may continue to progress in the queue until the user is at or near the head of the queue. When the user reaches the head of the queue, the user's position at the head of the queue is maintained, until the user indicates a desire to continue in the queue. In this manner, the user will be connected with an agent more quickly when the user continues in the queue, since the user's position was allowed to improve while the user was paused. Regardless of whether the user's position in the queue is preserved, or allowed to progress, the user will not be connected with an agent, until the user indicates a desire to continue in the queue.

The teachings of the present invention may also be used to provide a reminder to a user that is at or near the head of the queue, if such user is in the paused state. For example, if a user is listening to MOH, and a weather report is playing, the user may elect to pause her position in the queue, in order to listen to the weather. In this embodiment, ACD 40 may provide the user with a tone or pre-recorded voice indicating that the user is at or near the head of the queue, and is currently in the paused state. For example, a pre-recorded message may be played that indicates "to be transferred to an agent, please press '2', or say 'continue'." This will help prevent a user from forgetting that they are paused in the queue, and remaining on the line indefinitely.

In another embodiment, a message similar to the one described above may only be played to the user if the user is in the paused state for a predetermined period of time (e.g., 10 minutes). Playing the message to the user may allow the ACD to expedite the connection with the user and free-up resources. Similarly, if the user is in the paused state and the user is the only caller in the queue, the system may elect to connect the user with an agent, in order to maximize the utilization of it's resources.

Similarly, if the user is on hold for more than a predetermined amount of time (e.g., 5 minutes) the call center may be configured to disconnect the call in order to save resources. This is done, at least in part, to prevent a user from calling an "800" number and creating charges for the call center. The call center may also be configured to play a prompt to the caller to advise her that placing the call on hold for longer than five minutes may result in the system disconnecting the call.

In still another embodiment, an end-to-end hold signaling (far end hold) is utilized. When the caller to the call center places the call on hold at the endpoint of the user, the ACD is notified and the caller is automatically placed in the paused state at the ACD. When the caller removes the endpoint from hold, presses "2" and/or says "continue", the state of the user in the queue of the ACD is updated as "active" again, and the user progresses through the queue.

The pause feature may also be used in order to assist users that have already established a connection with an agent of the ACD. For example, a user that is speaking to an agent may realize that the user needs to obtain more information in order to conduct the transaction (e.g., obtain account information or statements). In prior systems, the user could either disconnect from the system, or leave the agent on hold. If the agent is left on hold too long, the agent may disconnect the call. In either scenario, the user is likely to lose her position in the queue.

To overcome this, the teachings of the present invention provide a mechanism by which the user can be placed on hold in order to have time to find the information, without being disconnected. This feature may be initiated by the agent or the user, if the user indicates to the agent or the ACD that the user would like to discontinue the present communication session with the agent, and remain in, or return to the head of, the queue when the user is ready.

This may be accomplished, for example, by having the agent transition the caller into a "pause" state, and move the caller to the head of the queue when the user finds the information (e.g., Social Security number) and indicates that she is ready to continue waiting for another agent (or the same agent). This may also be accomplished by having the user disconnect, and input a particular code or transaction number into the ACD, when the user locates the information, and establishes another connection with the ACD. This will allow the user to continue the communication session with the agent (or another agent) after the user collects the necessary information to complete the transaction.

It should be appreciated by those having ordinary skill in the art that the reference to "call" and "caller" as used throughout this specification include any "contact" with a "user." For example, the teachings of the present invention envision that the communication between the user and the call center may be accomplished may be accomplished by voice, text and/or other data transfer, in lieu of a telephone call. As one example, IM communication sessions between the user and the call center are described below.

In yet another embodiment of the present invention, one-way or two-way communication between the ACD and the user can be used to enhance the functionality of the call center. For example, the ACD may be configured to store IM information regarding users of the system (e.g., IM address), or the call center may be configured to collect such information from the user.

In an embodiment where one-way communication is used, the ACD may IM the user if the user reaches the head of the queue. For example, the ACD may IM the user to continue (remove themselves from hold status) if there are no callers behind the user in the queue, and/or the user reaches the head of the queue.

In an embodiment where two-way communication is used, the user may establish an IM session with the ACD and monitor her place in the queue, estimated wait time, etc, visually. In this embodiment the ACD may allow the user to transmit the "pause" and "continue" commands in order to change the user's state (e.g., active or paused) through the IM interface.

It will be recognized by those having ordinary skill in the art that the hardware, software and/or encoded logic of the call center, ACD, IVR and/or other components described herein may be centrally located or remotely distributed over a network. Components of the call center may be stored at one or more central locations, or at or near the terminal unit making the request for a connection (calling party) or the call center.

Endpoints 32-35 may be any combination of hardware, software and/or encoded logic that provide communication services to a user. For example, endpoints 32-35 may include a telephone, a mobile phone, a computer running telephony software, or any other communication hardware, software and/or encoded logic that supports telecommunications over analog (e.g., PSTN 39), or digital (e.g., VoIP) communication of packets of media using communication network 21. In the illustrated embodiment, endpoints 32-34 include an internet telephone, a personal computer and wireless handset, respectively. A wireless base station transmitter/receiver 36 couples endpoint 34 with communication network 31. Endpoints 32-35 may also include unattended or automated systems, gateways, other intermediate components or other devices that can establish media sessions. Although FIG. 1 illustrates four endpoints 32-35, communication system 30 contemplates any number and arrangement of endpoints 32-35 for communicating media.

Although specific communication networks 31 and 39 are illustrated in FIG. 1, the term "communication network" should be interpreted as generically defining any network capable of transmitting audio and/or video telecommunications signals, data and/or messages. Communication network 31 may be any computer or communication network capable of coupling two or more endpoints 32-35, for communication. In the illustrated embodiment, communication network 31 is a wide area network (WAN) that enables communication between a plurality of endpoints distributed across multiple cities and geographic regions, and communication network 39 is a public switched telephone network (PSTN). However, communication networks 31 and/or 39 may be one or more networks, including the Internet, the public switched telephone network, local area networks (LANs), global distributed networks such as intranets, extranets or other form of wireless or wireline communication networks.

Generally, communication network 31 provides for the communication of packets, cells, frames and/or other portions of information (generally referred to as packets) between and among endpoints 32-34. Communication paths for the communication of such packets may include any combination of routers, hubs, switches, gateways (e.g., gateway 37) or other hardware, software or embedded logic implementing any number of communication protocols that allow for the exchange of packets in communication system 30.

In a particular embodiment, communication network 31 employs communication protocols that allow for the addressing or identification of endpoints 32-34 coupled to communication network 31. For example, using Internet protocol (IP), each of the components coupled together by communication network 31 in communication system 30 may be identified in information directed using IP addresses. In this manner, communication network 31 may support any form and combination of point-to-point, multicast, unicast or other techniques for exchanging media packets among components in communication system 30.

Any given communication session between two of endpoints 32-34 will include the transfer of packets across one or more communication paths, that couple endpoints 32-35 and/or call center 38 across communication network 31. Such paths may include any combination of network components, gatekeepers, call managers, routers, hubs, switches, gateways, endpoints or other hardware, software or embedded logic implementing any number of communication protocols that allow for the exchange of packets in communication system 30.

Network 31 may be directly coupled to other IP networks including, but not limited to, the Internet. Since IP networks share a common method of transmitting data, telecommunication signals may be transmitted between telephony devices located on different, but interconnected, IP networks. In addition to being coupled to other IP networks, network 31 may also be coupled to non-IP telecommunication networks through the use of gateway 37.

For example, network 31 is coupled to Public Switched Telephone Network (PSTN) 39. PSTN 39 includes switching stations, central offices, mobile telephone switching offices, pager switching offices, remote terminals and other related telecommunications equipment that are located across the country.

The technology that allows telecommunications to be transmitted over an IP network may be referred to as Voice over IP (VoIP). In the illustrated embodiment, endpoints 32-34 and call center 38 are IP telephony devices. IP telephony devices have the capability of encapsulating a user's voice (or other inputs) into IP packets so that the voice can be transmitted over network 31.

Gateway 37 may accomplish several functions, such as converting analog or digital circuit-switched data transmitted by PSTN 39 to packetized data transmitted by network 31 and vice-versa. When voice data packets are transmitted from network 31, gateway 37 retrieves the data contained in the incoming packets and converts this digital data to the analog or digital format used by the PSTN trunk to which gateway 37 is coupled. Since the digital format for voice transmissions over an IP network is often different than the format used on the digital trunks of PSTN 39, the gateway provides conversion between these different digital formats, which is referred to as transcoding. Gateway 37 also translates between the VoIP call control system and other signaling protocols (e.g., SS7, T1, ISDN, etc.), used in PSTN 39.

FIG. 2 is a flow diagram illustrating a method for managing an incoming call using an integrated queue manager. The method of FIG. 2 allows the user to actively manage and control her call treatment by the ACD.

Referring to FIG. 2, the method begins at step 102 where a request for connection is received at a call center. For example, a user may contact the call center and request a connection with one of plurality of agents, in order to conduct a transaction. The call center may be equipped with an interactive voice response ("IVR") system, in order to automatically collect various information from the user, regarding the transaction. As discussed above, the IVR may also be used in order to collect contact information (e.g., Instant Message address information) from the user. Once the information is collected, the user may be placed on hold, and may be presented with music on hold.

If none of the plurality of agents are available, the request for connection is queued at step 104. As discussed above, various algorithms may exist for the handling of specific users, and their respective requests for connection with the ACD. Regardless of the algorithm that is used, the user progresses in the queue until the user reaches the head of the queue. For the purposes of this specification, the head of the queue refers to a position in the queue in which the user is approaching a position where it is likely that the user will be connected with an agent relatively quickly.

At step 106, a request to delay the request for connection is received at the ACD. In this manner, the user is requesting that his progress in the queue be paused, or that the connection with the agent be delayed, while the user accomplishes another task. For example, the user may have received another telephone call on a different extension. In another embodiment, the system may employ an end-to-end hold system, in which the ACD is able to detect that the user placed an endpoint associated with the user on hold. For example, if the user is using a business telephone and depresses the hold button, the ACD will automatically delay the connection between the user and the ACD, until the ACD receives an indication that the user would like to continue in the queue. In still another embodiment, the ACD may receive an indication that the user would like to delay the connection with the ACD, using an IM communication session with the ACD.

At step 108, the connection between the user and the ACD is delayed. In a particular embodiment, the delay may be accomplished by freezing the position of the user in the queue. In other words, each time a call ahead of the user is connected with an agent, the caller immediately behind the user in the queue is advanced to a position ahead of the user. This allows the user to maintain his position in the queue, while he accomplishes another task. As discussed above with regard FIG. 1, the delay may also be accomplished by allowing the user to progress in the queue until the user is at or near the head of the queue, then freezing the user's position until the user indicates that he would like to continue in the queue.

Next, at step 110, a request to continue in the queue is received at the ACD. The user can communicate his desire to continue in the queue by any one or more of the various means discussed above. At step 112, the user continues in the queue until an agent becomes available. The user is connected with an agent at step 114.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method for integrated queue management, comprising:

receiving, from a user, a request for a connection to one of a plurality of agents;

queuing the request for a connection if the plurality of agents are unavailable;

receiving, from the user, a request to delay the connection with the one of the plurality of agents;

delaying the connection with the one of the plurality of agents;

providing, to the user, a reminder that the request for a connection is being delayed at the user's request, when the user reaches a primary position in the queue;

receiving, from the user, a request to continue in the queue; and connecting the user with one of the plurality of agents.

2. A method for integrated queue management, comprising:

receiving, from a user, a request for a connection to one of a plurality of agents;

queuing the request for a connection if the plurality of agents are unavailable;

receiving, from the user, a request to delay the connection with the one of the plurality of agents;

delaying the connection with the one of the plurality of agents;

providing, to the user, a reminder that the request for a connection is being delayed at the user's request, if the request for a connection is delayed longer than a predetermined period of time;

receiving, from the user, a request to continue in the queue; and connecting the user with one of the plurality of agents.

3. A method for integrated queue management, comprising:

receiving, from a user, a request for a connection to one of a plurality of agents;

queuing the request for a connection if the plurality of agents are unavailable;

receiving, from the user, a request to delay the connection with the one of the plurality of agents;

delaying the connection with the one of the plurality of agents;

receiving, from the user, a request to continue in the queue;

collecting Instant Messaging information from the user;

transmitting an Instant Message to the user, when the user reaches the head of the queue, indicating that the user should prepare to connect with one of the plurality of agents; and connecting the user with one of the plurality of agents.

4. The method of claim 3, wherein the Instant Message is sent if the user has delayed the request for a connection, and there are no other callers in the queue.

5. A method for integrated queue management, comprising:

receiving, from a user, a request for a connection to one of a plurality of agents;

queuing the request for a connection if the plurality of agents are unavailable;

receiving, from the user, a request to establish an Instant Messaging session with a call center;

establishing the Instant Messaging session between the user and the call center, wherein the user may submit commands regarding the request for a connection, using the Instant Messaging session;

providing information to the user regarding the user's position in a queue, using the Instant Messaging session; and connecting the user with one of the plurality of agents.

6. The method of claim 5, further comprising:

receiving, from the user, an indication that the user would like to delay the request for a connection to one of the plurality of agents, using the Instant Messaging session; and delaying the request for a connection with the one of the plurality of agents.

7. The method of claim 6, further comprising receiving an indication from the user that the user would like to return to the queue.

8. A method for integrated queue management, comprising:

receiving, from a user, a request for a connection to one of a plurality of agents;

connecting the user with one of the plurality of agents;

receiving, from the user, an indication that the user would like to pause a communication session with the agent;

pausing the communication session while maintaining the user at a high priority in a queue;

receiving, from the user, a request to continue the communication session; and reconnecting the user with one of the plurality of agents.

9. A system for integrated queue management, comprising:

an interface being operable to receive, from a user, a request for a connection to one of a plurality of agents;

a queuing system being operable to queue the request for a connection if the plurality of agents are unavailable;

the interface being further operable to receive, from the user, a request to delay the connection with the one of the plurality of agents;

a processor being operable to delay the connection with the one of the plurality of agents;

the interface being further operable to receive, from the user, a request to continue in the queue;

an automatic call distributor being operable to connect the user with one of the plurality of agents; and wherein the processor is further operable to:

allow the request for a connection to progress in a queue until the request for a connection reaches a head of the queue; and maintain the request for a connection at the head of the queue until the request to continue in the queue is received;

wherein the interface is further operable to communicate, to the user, a reminder that the request for a connection is being delayed at the user's request, when the user reaches the primary position in the queue.

10. A system for integrated queue management, comprising:

an interface being operable to receive, from a user, a request for a connection to one of a plurality of agents;

a queuing system being operable to queue the request for a connection if the plurality of agents are unavailable;

the interface being further operable to receive, from the user, a request to delay the connection with the one of the plurality of agents;

a processor being operable to delay the connection with the one of the plurality of agents;

the interface being further operable to receive, from the user, a request to continue in the queue;

an automatic call distributor being operable to connect the user with one of the plurality of agents; and wherein the processor is further operable to:

allow the request for a connection to progress in a queue until the request for a connection reaches a head of the queue; and maintain the request for a connection at the head of the queue until the request to continue in the queue is received;

wherein the interface is further operable to provide, to the user, a reminder that the request for a connection is being delayed at the user's request, if the request for a connection is delayed longer than a predetermined period of time.

11. The system of claim 9, wherein the request to delay the connection with the one of the plurality of agents, comprises a signal received from an endpoint associated with the user, indicating that the user has placed the endpoint on hold.

12. A system for integrated queue management, comprising;
an interface being operable to receive, from a user, a request for a connection to one of a plurality of agents;
a queuing system being operable to queue the request for a connection if the plurality of agents are unavailable;
the interface being further operable to receive, from the user, a request to establish an Instant Messaging session with a call center;
the call center being operable to establish an Instant Messaging session between the user and the call center, wherein the user may submit commands regarding the request for a connection, using the Instant Messaging session;
the interface being further operable to provide information to the user regarding the user's position in a queue, using the Instant Messaging session; and
an automatic call distributor being operable to connect the user with one of the plurality of agents.

13. The system of claim 12, further comprising:
the interface being further operable to receive, from the user, an indication that the user would like to delay the request for a connection to one of the plurality of agents, using the instant messaging session; and
the processor being further operable to delay the request for a connection with the one of the plurality of agents.

14. The system of claim 13, wherein the interface is further operable to receive an indication from the user that the user would like to return to the queue.

15. Software embodied in a tangible computer readable medium, the computer readable medium comprising code operable to:
receive, from a user, a request for a connection to one of a plurality of agents;
queue the request for a connection if the plurality of agents are unavailable;
receive, from a user, a request to establish an Instant Messaging session with a call center;
establish an Instant Messaging session between the user and the call center, wherein the user may submit commands regarding the request for a connection, using the Instant Messaging session;
provide information to the user regarding the user's position in a queue, using the Instant Messaging session; and
connect the user with one of the plurality of agents.

16. The medium of claim 15, wherein the code is further operable to:
receive, from the user, an indication that the user would like to delay the request for a connection to one of the plurality of agents, using the Instant Messaging session; and
delay the request for a connection with the one of the plurality of agents.

17. The medium of claim 16, wherein the code is further operable to receive an indication from the user that the user would like to return to the queue.

18. Software embodied in a tangible computer readable medium, the computer readable medium comprising code operable to:
receive, from a user, a request for connection to one of a plurality of agents;
connect the user with one of the plurality of agents;
receive, from the user, an indication that the user would like to pause a communication session with an agent;
pause the communication session while maintaining the user at a high priority in a queue;
receive, from the user, a request to continue the communications sessions; and
reconnect the user with one of the plurality of agents.

19. A system for integrated queue management, comprising:
means for receiving, from a user, a request for a connection to one of a plurality of agents;
means for queuing the request for a connection if the plurality of agents are unavailable;
means for receiving, from the user, a request to establish an Instant Messaging session with a call center;
means for establishing the Instant Messaging session between the user and the call center, wherein the user may submit commands regarding the request for a connection, using the Instant Messaging session;
means for providing information to the user regarding the user's position in a queue, using the Instant Messaging session; and
means for connecting the user with one of the plurality of agents.

20. A system for integrated queue management, comprising:
means for receiving, from a user, a request for a connection to one of a plurality of agents;
means for connecting the user to one of the plurality of agents;
means for receiving, from the user, an indication that the user would like to pause a communication session with the agent;
means for pausing the communication session while maintaining the user at a high priority in a queue;
means for receiving, from the user, a request to continue the communication session; and
means for reconnecting the user with one of the plurality of agents.

21. A method for integrated queue management, comprising:
establishing a connection between a user and one of a plurality of agents;
receiving a request, from the user, to pause the connection;
pausing the connection and placing the user in a queue;
receiving a request, from the user, to re-establish the connection between the user and one of the plurality of agents; and
connecting the user with one of the plurality of agents.

22. The method of claim 21, wherein pausing the connection comprises maintaining the request for a connection at the head of the queue until the request to re-establish the connection is received.

23. The method of claim 21, further comprising collecting information from the user using an interactive voice response system (IVR).

24. The method of claim 21, wherein placing the user in the queue comprises placing the user in a high priority in the queue.

25. The method of claim 21, wherein the user's position in the queue is maintained until the request to re-establish the connection is received.

26. A method for integrated queue management, comprising:
establishing a connection between a user and one of a plurality of agents;
receiving a request to pause the connection;
pausing the connection and placing the user in a queue;

providing, to the user, a reminder that the connection is paused, when the user reaches a primary position in the queue;

receiving a request to re-establish the connection between the user and one of the plurality of agents; and connecting the user with one of the plurality of agents.

27. A method for integrated queue management, comprising:

establishing a connection between a user and one of a plurality of agents;

receiving a request to pause the connection;

pausing the connection and placing the user in a queue;

providing, to the user, a reminder that the connection is paused, if the request to re-establish the connection is delayed longer than a predetermined period of time;

receiving a request to re-establish the connection between the user and one of the plurality of agents; and connecting the user with one of the plurality of agents.

28. A system for integrated queue management, comprising:

an interface being operable to establish a connection between a user and one of a plurality of agents;

the interface being further operable to receive, from the user, a request to pause the connection;

a processor being operable to pause the connection and place the user in a queue;

the interface being further operable to receive a request, from the user, to re-establish the connection between the user and one of the plurality of agents; and a call distributor being operable to connect the user with one of the plurality of agents.

29. The system of claim 28, wherein the processor is further operable to maintain the request for a connection at the head of the queue until the request to re-establish the connection is received.

30. The system of claim 28, further comprising an interactive voice response system being operable to collect information from the user.

31. The system of claim 28, wherein the processor is further operable to maintain the user's position in the queue until the request to re-establish the connection is received.

32. The system of claim 28, wherein the interface is further operable to transmit, to the user, a reminder that the connection is paused, when the user reaches a primary position in the queue.

33. The system of claim 28, wherein the interface is further operable to transmit, to the user, a reminder that the connection is paused, if the request to re-establish the connection is delayed longer than a predetermined period of time.

34. A method for integrated queue management, comprising:

receiving, from a user, a request for a connection to one of a plurality of agents;

queuing the request for a connection if the plurality of agents are unavailable;

receiving, from the user, a request to delay the connection with the one of the plurality of agents;

delaying the connection with the one of the plurality of agents;

disconnecting the user if a request to continue in the queue is not received from the user within a predetermined time period.

35. The method of claim 34, further comprising playing a prompt to the user indicating that the user may be disconnected if the user does not request to continue in the queue within the predetermined period of time.

36. The method of claim 34, further comprising playing a warning message to the user indicating that the user is about to be disconnected, prior to disconnecting the user.

37. A system for integrated queue management, comprising:

an interface being operable to receive, from a user, a request for a connection to one of a plurality of agents;

a queuing system being operable to queue the request for a connection if the plurality of agents are unavailable;

the interface being further operable to receive, from the user, a request to delay the connection with the one of the plurality of agents;

a processor being operable to delay the connection with the one of the plurality of agents;

the processor being further operable to disconnect the user if a request to continue in the queue is not received from the user within a predetermined time period.

38. The system of claim 37, wherein the interface is further operable to transmit a prompt to the user indicating that the user may be disconnected if the user does not request to continue in the queue within the predetermined period of time.

39. The system of claim 37, wherein the interface is further operable to transmit a warning message to the user indicating that the user is about to be disconnected, prior to disconnecting the user.

* * * * *